United States Patent [19]
Fouts

[11] 3,900,221
[45] Aug. 19, 1975

[54] ANGLE ADAPTOR FITTING

[76] Inventor: Robert E. Fouts, 2152 Van Karajan Dr., San Pedro, Calif. 90732

[22] Filed: Jan. 28, 1974

[21] Appl. No.: 437,282

[52] U.S. Cl. ............... 285/276; 285/168; 285/179; 285/351
[51] Int. Cl.² ........................................ F16L 27/00
[58] Field of Search .......... 285/168, 179, 276, 277, 285/351

[56] References Cited
UNITED STATES PATENTS

| 456,756 | 7/1891 | Bastian | 285/276 |
| 2,525,652 | 10/1950 | Cuningham | 285/281 |
| 3,148,922 | 9/1964 | Roessler | 285/276 x |
| 3,411,811 | 11/1968 | Holland | 285/281 x |
| 3,552,778 | 1/1971 | Muller | 285/276 |

*Primary Examiner*—Dave W. Arola
*Attorney, Agent, or Firm*—Miketta, Glenny, Poms & Smith

[57] ABSTRACT

A swivel fitting for rotatably mounting two ends of hose or pipe together includes a female member and a male member. Both have cylindrical sidewalls, the inside diameter of the female member being larger than the outside diameter of the male member. The female member has a generally circular rear wall and the male member has a generally circular front wall spaced apart from the rear wall of the female member. The members have aligned fluid openings extending perpendicular to the front and rear walls, and locking means between the members maintain a given orientation of the male member in the female member. The swivel fitting has been improved by having first seal means of a circular O-ring extending between the cylindrical sidewall of the male member adjacent the cylindrical sidewall of the female member when the male member and the female member are maintained in the given orientation by the locking means. Preferably, the O-ring is located in a circumferential groove extending about the outside of the male member and the O-ring protrudes out of the groove. The inside diameter of the female member and the outside diameter of the male member and the depth of the groove are of such dimension relative to the diameter of the O-ring to compress the O-ring when the male and female members are maintained in the given orientation by the locking means. Second seal means, a circular O-ring, is located between the front wall and rear wall when the members are maintained in their given orientation. Preferably, the O-ring is located in an annular groove about the rear wall of the female member and protrudes from the groove. The spacing of the front and rear walls, the depth of the annular groove, and the diameter of the O-ring are such that the O-ring is compressed. Both O-rings are compressed a given amount relative to the dimensions of the member to allow improved sealing and improved rotation between the members.

3 Claims, 3 Drawing Figures

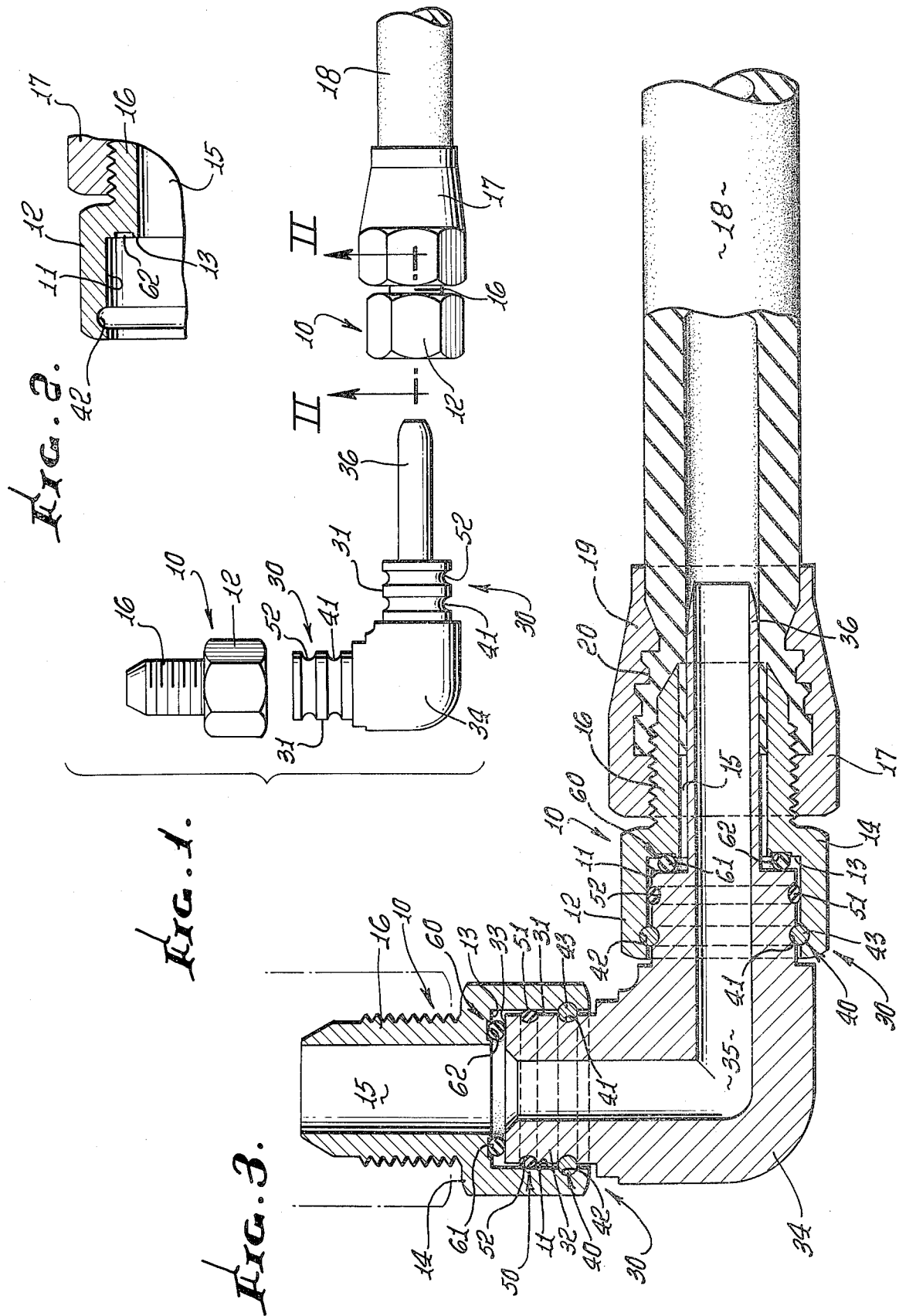

ANGLE ADAPTOR FITTING

BACKGROUND OF THE INVENTION

Many prior art fittings for hoses are known in the prior art, and it is known to provide swivel fittings whereby one end of the fitting can rotate relative to the other end of the fitting. An example of such a fitting is that disclosed in U.S. Pat. No. 3,752,506, dated Aug. 14, 1973. There it is taught to have a swivel fitting with a wire connector 41 within a groove between the male and female members holding those members in their correct orientation. An O-ring 40 fits in a groove in the male member and is compressed by the female member to act as a seal.

There is a tendency in certain prior art devices to encounter slight pivoting between the male and female members which inhibits swiveling and allows leaking. In devices such as the aforementioned U.S. Pat. No. 3,752,506, the O-ring 40 will compensate for much of this pivoting. However, as the fit between the O-ring and the respective member is made tighter to better compensate for pivoting, swiveling will be hampered.

It is therefore a general object of the present invention to provide a swivel fitting which overcomes the disadvantages of the prior art devices and which is inexpensive to manufacture, reliable in operation, and is simple to use and install. A specific object of the invention is to provide a swivel fitting which will allow for improved rotation of the members relative to each other and which maintains the alignment of the members. A further object is to provide such swiveling while maintaining an effective seal between the members so that fluid flowing through the swivel fitting will not leak therefrom. These objects are particularly important when the swivel fitting is adapted to an elbow fitting because in such an elbow fitting the tendency for pivoting along the fitting is greater.

In the typical swivel fitting with a male member insertable into a female member, both of the members being generally cylindrical and rotatable with respect to each other, and locking means between the male and female members to maintain a given orientation between those members, the above objects have been accomplished by having the improvement of having a circumferential groove extending between the cylindrical sidewalls of the male and female members when they are maintained in the given orientation by the locking means. A first resilient seal is located in the groove and protrudes therefrom. The dimensions of the inside of the female member, the outside of the male member, the depth of the groove and the diameter of the first resilient seal are such as to compress the seal when the male and female members are maintained in the given orientation by the locking means so that the first seal seals the cylindrical walls, allows for rotation of the members relative to each other and maintains alignment of the members. An annular groove is formed between the rear wall of the female member and the front wall of the male member for receiving a second resilient seal therein. The second resilient seal is of a thickness relative to the depth of the annular groove and the spacing of the end wall and front wall established by the given orientation that the second seal is also compressend between the front wall and the rear wall when the members are maintained in the given orientation by the locking means so that the second seal means forms a seal between the end wall and the front wall, allows for rotation of the members relative to one another, and maintains alignment of the members.

BRIEF DESCRIPTION OF THE DRAWINGS

FIG. 1 is a side view of an elbow fitting utilizing the swivel fitting of the instant invention.

FIG. 2 is a cross-sectional view of the fitting taken along the plane II—II.

FIG. 3 is a cross-sectional view of the assembled swivel fitting embodied in an elbow connector.

DETAILED DESCRIPTION OF THE PREFERRED EMBODIMENT

Referring to FIG. 1, there is shown an exploded view of the instant invention. Male members 30 are connected between the elbow connector 34 and are insertable into female members 10. Hose 18 is connected to one female member 10 by the hose coupling 17. Briefly, nipple 36 extending from the male member 30 fits within the center of hose 18. Hose gripping means 20 on the diametrically reduced portion 19 of the hose coupling 17 grips the hose 18 and pulls it toward the female member 10 as the hose coupling 17 is screwed onto the connector 16. The sharp end of the connector 16 goes through the end of the hose 18 to assist in holding the hose between the hose coupling 17, the connector 16, and the nipple 36. The other female member 10 could likewise be connected to a hose or other fluid delivery means.

The female member 10 generally comprises a cylindrical wall 12 with an interior cylindrical surface 11. Rear wall 14 having a rear surface 13 closes the cylinder of the female member. Fluid opening 15 passes through the rear wall to allow fluid to flow through the female member. Extending from the rear wall 14 is the aforementioned connector 16 for connection to auxiliary fluid flow means as mentioned above. The male member is inserted into the female member and has a generally cylindrical sidewall of an outside diameter slightly smaller than the inside diameter of the female member. The male member has a generally circular front wall spaced apart from the rear wall of the female member and has a fluid opening aligned with the fluid opening of the female member. In the exemplary embodiment, the male member 30 has a cylindrical surface 31 on the cylindrical wall 32. The cylindrical wall 32 terminates in the front surface 33. The fluid opening 35 passes generally perpendicular through the front surface 33 and is aligned with the fluid opening 15 of the female member, which also passes generally perpendicularly to the rear wall 14 of the female member. In the instant invention, the swivel fitting is depicted in an elbow connector and two male members 10 connected by the elbow connection 34. As previously mentioned, a nipple 36 may extend from one or both of the male connectors for connection with the hose 18.

Locking means between the male and female members maintain a given orientation of the male member in the female member. In the exemplary embodiment, the locking means 40 comprises a wire connector 43 in the male locking groove 41 on the male member and the female locking groove 42 on the female member. The wire connector serves to lock the male locking groove adjacent to the female locking groove to hold the male and female members in a given orientation. The wire connector specifically prevents axial movement between the male and female members yet allows for rotation of the male member relative to the female member.

First seal means between the sidewalls of the members when the members are maintained in the given orientation by the locking means seal the cylindrical walls, allows for rotation of the members relative to each other, and maintains alignment of the members. In the exemplary embodiment, such first seal means 50 is formed of an O-ring 51 which fits into the circumferential groove 52 between the male and female members. A groove will normally be cut into the male member. The O-ring is generally of circular cross-section and is stretched to fit into the groove 52. The dimensions of the O-ring, the outside diameter of the male member, the inside diameter of the female member, and the depth of the groove 52 are crucial if the O-ring is to provide for an effective seal and yet allow for rotation between the members. If the O-ring is compressed too much, it will tend to inhibit rotation, but if the O-ring fits loosely in the groove 52, fluid will be able to leak past the O-ring. The specific dimensions of the groove and the O-ring will vary depending on the size of the fitting. It has been found that the O-ring associated with the first seal means should protrude a small distance relative to its diameter. It has been found that the protrusion of the O-ring should be less than half its diameter, and should preferably be less than one-fourth of its diameter. Depending on the diameter of the members, the exact depth of the groove and diameter of the O-ring can be determined experimentally.

Second seal means between the front and the end walls when the members are maintained in the given orientation by locking means seal the cylindrical walls, allow for rotation of the members relative to each other, and maintain alignment of the members. In the exemplary embodiment, the second sealing means 60 includes an annular groove 62 between the rear wall and the front wall and a second resilient seal means for placement within the annular groove. Generally, the second resilient seal means is an O-ring 61 having a circular cross-section of a diameter relative to the depth of the annular groove and the spacing of the front wall and the rear wall relative to the given orientation that the O-ring is compressed between the front wall and the rear wall when the members are maintained in the given orientation by the locking means. In the exemplary embodiment, the annular groove 62 is formed on the rear wall 14 and has a non-circular cross-section with a width substantially greater than the depth. The O-ring 61 is placed in the annular groove 62 and it is compressed when the members are assembled and locked by the locking means 40. The dimensions of the O-ring 61 and the spacing between the front surface 33 and the rear surface 13, and the depth of the groove 62 are again crucial. It has been found that the compression of O-ring 61 should not be as great as the compression of O-ring 51, and more than half the diameter of O-ring 61 protrudes from the groove 62 when the members are assembled together. Therefore, the radius of the O-ring is greater than the depth of the annular groove. It has been found that it is advangageous to have the width of the groove at least twice as wide as the depth of the annular groove. Also, the depth of the annular groove is less than the depth of the circumferential groove. It has been found that the protrusion of the second O-ring should be more than half its diameter and preferably, the protrusion should be about three-fourths of the diameter of the second O-ring.

The two O-rings complement each other and both function to maintian alignment of the members relative to each other, allow for rotation between the members, and act as effective seals to prevent leakage from the members. The elimination of either O-ring would force a greater load on the O-ring and as the seal effectiveness were improved in the remaining O-ring, the ability to allow for rotation between the members would be diminished. Therefore, a comprise is reached by having two O-rings on different facing walls. The exact protrusion of each O-ring is variable depending upon the dimensions of the members. However, it should be remembered that the O-ring in the circumferential groove has a much smaller protrusion than does the O-ring in the annular groove. Moreover, the depth of the annular groove is smaller than the depth of the circumferential groove and the width of the annular groove is greater than the depth of the annular groove.

Thus, a swivel fitting for rotatably mounting two ends of hoses or pipes includes a female member 10 having a generally cylindrical sidewall 11 and a generally circular rear wall 13 closing the sidewall. A male member 30 is inserted into the female member and has a generally cylindrical sidewall 31 of an outside diameter smaller than the inside diameter fo the female member. The male member has a generally circular front wall 33 spaced apart from the rear wall of the female member. An aligned fluid opening 15, 35 extends perpendicular to the front and rear walls. Locking means 40 between the male and female members maintains a given orientation of the male member in the female member. A circumferential groove 52 extends between the cylindrical sidewalls when the male member and the female members are maintained in the given orientation by the locking means. An O-ring 51 associated with first resilient seal means 50 is located within and extends around the circumferential groove and protrudes out of the groove. The inside diameter of the female member, the outside diameter of the male member, and the depth of the groove are of such dimensions that the seal means are compressed when the male and female members are maintained in the given orientation by the locking means. An annular groove 62 is formed between the rear wall and the front wall and an O-ring 61 associated with second resilient seal means is placed within the annular groove. The second seal means is of such a thickness relative to the depth of the annular groove and the spacing of the front wall and the rear wall established by the given orientation that the seal means is compressed between the front wall and the rear wall when the members are maintained in the given orientation. This arrangement causes the first and the second seal means to form a seal between the cylindrical walls and between the end wall and front wall respectively, allows rotation of the members relative to one another, and maintains alignment of the members.

I claim:

1. In a swivel fitting for rotatably mounting two ends of hose or pipe including:
a female member having a generally cylindrical sidewall and a generally circular rear wall closing the sidewall;
a male member inserted into said female member and having a generally cylindrical sidewall of an outside diameter smaller than the inside diameter of the female member, said male member having a generally circular front wall spaced apart from said rear wall of said female member, said members having an aligned fluid opening extending perpendicular to the front and rear walls;

locking means between the male and female members to maintain a given orientation of said male member in said female member;

a circumferential groove extending between said cylindrical sidewalls when said male and female members are maintained in said given orientation by said locking means;

first resilient seal means comprising an O-ring of resilient material having a generally circular cross-section and located within and extending around said circumferential groove, said circumferential groove having a depth and width and wherein said O-ring protrudes out of said groove;

an annular groove between said rear wall and said front wall, said annular groove having a width and a depth, said annular groove being formed on said rear wall; and second resilient seal means within said annular groove, the improvement comprising the provision of:

said inside diameter of said female member, said outside diameter of said male member, and said depth of said groove being of such dimension that said seal means is compressed when said male and female members are maintained in said given orientation by said locking means so that said first seal means seals the cylindrical walls, allows for rotation of said members relative to each other, and maintains alignment of said members; said circumferential groove having a depth and width, wherein the radius of said O-ring is greater than the depth of said groove so that said O-ring protrudes from said groove;

said second seal means being of a thickness relative to the depth of said annular groove and the spacing of the front wall and rear wall established by said given orientation such that the second seal means is compressed between the front wall and the rear wall when said members are maintained in said given orientation by said locking means so that said second seal means forms a seal between the end wall and the front wall, said second seal means including an O-ring of resilient material having a circular cross-section;

the radius of said O-ring of said second seal means being greater than the depth of said annular groove so that said O-ring of said second seal protrudes from said annular groove;

the distance of protrusion of said O-ring of said second seal means from said annular groove is greater than the protrusion of said O-ring of said first seal means from said circumferential groove.

2. The improved device of claim 1 further including the provision of:

the depth of said circumferential groove being greater than the depth of said annular groove.

3. The improved device of claim 2 further including the provision of:

the width of said annular groove being at least twice as wide as the depth of said annular groove.

* * * * *

UNITED STATES PATENT OFFICE
CERTIFICATE OF CORRECTION

Patent No. 3,900,221                     Dated August 19, 1975

Inventor(s) Robert E. Fouts

It is certified that error appears in the above-identified patent and that said Letters Patent are hereby corrected as shown below:

Column 2, line 53, after "10" and before "con-" insert -- are --. Column 3, line 62, after "of the" and before "groove", insert -- annular --.

Signed and Sealed this

*second* Day of *March 1976*

[SEAL]

Attest:

RUTH C. MASON  
*Attesting Officer*

C. MARSHALL DANN  
*Commissioner of Patents and Trademarks*